June 8, 1965 N. A. MILLER ETAL 3,187,971

TAPE CLAMP

Filed May 20, 1963

INVENTORS
NORMAN A. MILLER
CARMINE V. DI CAMILLO

BY David Teschner
ATTORNEY 3,187,971

TAPE CLAMP

Norman A. Miller, Philadelphia, Pa., and Carmine V. Di Camillo, Merchantville, N.J., assignors to Sperry Rand Corporation, New York, N.Y., a corporation of Delaware Filed May 20, 1963, Ser. No. 281,492
2 Claims. (Cl. 226—95)

This invention pertains to vacuum-type tape handling apparatus and more particularly to a tape clamp device for use in a vacuum-type tape handling apparatus which aids in the guiding, loop forming and tensioning of tape moving through the vacuum loop boxes thereof.

Vacuum tape handling apparatus in use today employ vacuum loop boxes placed between the capstan and each of the supply and takeup reels. The vacuum loop boxes are each filled with a loop of tape either from the supply or the takeup reels and serve as a reservoir for tape to be moved from one reel to the other. The reservoir decreases the amount of tape which must be accelerated or decelerated by the capstans when a tape is to be moved. If such loop boxes were not provided, the entire reel of tape would have to be accelerated or decelerated by the capstan placing great strain upon such capstan and increasing the time of acceleration or deceleration by a great extent. The reservoirs of tape within the loop boxes also insure more uniformity of tape motion. The uniformity comes about from the fact that tape is being withdrawn from a ready reservoir of unreeled tape and does not depend upon the reeling or unreeling of the supply and takeup reels. The size and length of the tape loop and its relative position with regard to the vacuum loop boxes will depend upon such factors as the mode of operation of the tape handling device. For example, the modes of operation may include forward read, that is tape moving from the supply to takeup reel, backward read, that is tape moving from the takeup reel to the supply reel, and rewind. The position or length of loop of the tape in the vacuum loop box will also be dependent upon the acceleration or deceleration of the tape and the relative air pressures which exist above and below the tape as it forms its loop in a vacuum loop box.

In the usual configuration, a partial vacuum or low pressure exists below the tape in such a loop box whereas atmospheric pressure is admitted above such a tape. The differential between the atmospheric pressure and the degree of partial vacuum present below the tape will cause a certain length of loop. This length of loop may be controlled by altering the amount of pressure present below the tape.

As the mode of operation of the device is changed, the differential pressure normally is changed within the loop box so that proper loops for forward or backward operation may be available. Sudden changes in the mode of operation or fluctuations in the pressure differential between the atmospheric pressure and the partial vacuum will cause the tape to take on different loop positions and in fact fail to contact the side walls of the vacuum loop box as is required in normal operation. If such contact fails between the tape and the side walls, there is a decrease in the tension upon the tape and it may be moved too rapidly or cause it to be stretched by the rapid motion of the capstan pulling directly against the tape coming from the supply or takeup reel. Further, as the tape is moved by the capstan, there may be alternate times during which the tape is returned to its proper position contacting the side wall followed by times at which contact is not made. This jittering of the tape can affect the readout of information from the tape's surface. It is, therefore, an object of this invention to provide an improved form tape clamp device to overcome the shortcomings of currently used vacuum tape handling apparatus as described above.

It is another object of this invention to provide an improved form of tape clamp device to permit tape within vacuum loop boxes in a tape handling apparatus to follow prescribed paths.

It is another object of this invention to provide an improved tape handling apparatus.

It is another object of this invention to provide an improved form of tape clamp device to operate upon tape within a vacuum loop box to aid in the controlling of the tension placed upon such tape.

It is another object of this invention to provide improved vacuum loop boxes for a tape handling apparatus.

It is another object of this invention to provide an improved form of tape clamp device for use in a vacuum tape handling apparatus which aids in the suppression of oscillation of tape within such vacuum loop boxes.

It is yet another object of this invention to provide an improved form of tape clamp device which can provide functions such as tape guiding and tape loop forming.

It is still another object of this invention to provide an improved form of tape clamp device which is simple to construct and requires no moving parts.

It is still another object of this invention to provide an improved form of tape clamp device for use in vacuum type tape handling apparatus which operates according to Bernoulli's principle and which employs air or fluid pressures already available within the tape handling device.

Other objects and features of the invention will be pointed out in the following description and claims and illustrated in the accompanying drawings, which disclose by way of example, the principle of the invention.

In the drawings.

Similar elements are given similar reference characters in each of the respective figures.

The principle of operation of the present invention may be described in the following manner. Air pressures available within the tape handling apparatus are employed to produce the clamping action necessary to hold the tape against the side walls of the vacuum loop box and thus maintain correct loop position and tension of the tape. This clamping action is accomplished by providing channels within the side wall of the vacuum loop box to permit the atmospheric pressure which exists above the tape within the vacuum loop box to communicate with the partial vacuum which exists below the tape within such box. Due to the pressure differentials which exist between the air at atmospheric pressure above the tape and the partial vacuum which exists below it, the air above the tape will move rapidly via the aforementioned channels into the area of partial vacuum pressure below the tape causing an area of low pressure to exist between the tape and the channels of the side wall. According to Bernoulli's principle, any fluid moving at a high rate of speed will cause a low pressure area to be created. Thus, with the low pressure area existing between the tape and channelled side wall and atmospheric pressure existing on the other surface of the tape, the tape is forced into intimate contact with the side wall. The pressure existing in this low pressure area is controlled by the size of the channels in the side wall and can be arranged to be sufficient to hold the tape against the side wall but not to restrain it from motion relative to the side wall. Stated another way, the pressure built up is sufficient to hold the tape into contact with the side walls providing there is no force exerted upon the tape by means of the capstans or reels. At time of movement by the capstans or reels, the tape is guided along the side wall by the effects of the low pressure area behind the tape.

Figure 1:
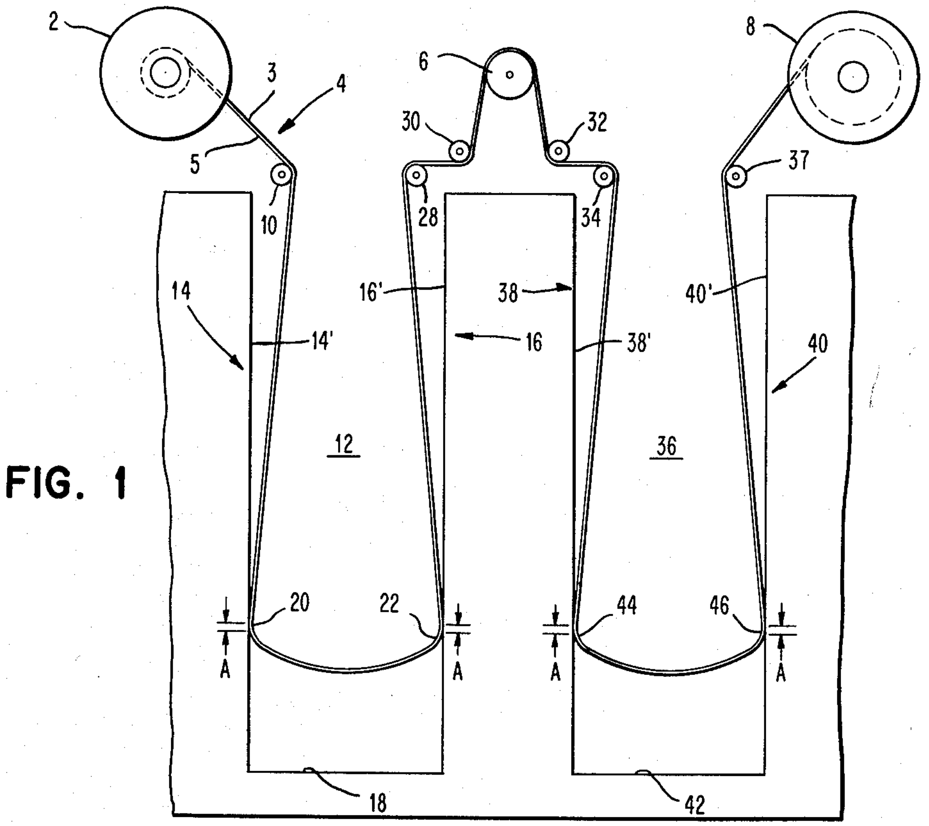
FIGURE 1 is a schematic of a tape handling apparatus employing the invention.

Referring now to FIGURE 1, a schematic of a highly simplified tape handling apparatus employing the invention with front and back panels removed is shown. The apparatus consists of a supply reel 2 of a magnetizable tape 4 which is driven by means of a capstan 6 to a takeup reel 8. The tape 4 which has an upper surface 3 and a lower surface 5, passes from the supply reel 2 over a first guide roller 10 into a first vacuum loop box 12. The vacuum loop box has a left side wall 14, a right side wall 16 and a base 18. The surface of side wall 14 adjacent the tape is designated 14′, whereas the surface of wall 16 adjacent the tape is designated 16′. The tape as it moves through the vacuum loop box is made to contact the left wall surface 14′ at an area 20 and to contact the right side wall surface 16′ at an area 22. The location of the area of contact of the tape with the side walls will be dependent upon the mode of operation of the tape handling device (that is forward, reverse or rewind operation) and upon the relative pressure differential between the air at atmospheric pressure above the tape 4 and that of the pressure fluid or air below the tape 4. The length of the contact area, designated A in the figures, will be dependent upon the relative pressures behind the tape, that is between the side wall surface 14′ and surface 5 of the tape 4 and the pressure existing on surface 3 of the tape 4. At each of the tape contact areas A (20, 22, 44 and 46) will be found a tape clamp device of the type to be described below but not shown in FIGURE 1. The tape clamp at each of these locations will be much larger than the contact area A to account for variations in the tape loop with pressure differentials and mode of operation of the tape handling apparatus.

Upon leaving the vacuum loop box 12, the tape 4 is passed over a further guide roller 28 and under guide roller 30 to the capstan 6. Thereafter, the tape 4 is passed under a guide roller 32 and thence over a guide roller 34 into a second vacuum loop box 36. The tape 4 then passes from vacuum loop box 36 over guide roller 37 to the takeup reel 8.

The vacuum loop box 36 has a left side wall 38 with a surface 38′ adjacent the tape, and a right side wall 40 with a surface 40′ adjacent the tape, and a base member 42. The tape 4 also comes into contact with the side walls of the vacuum loop box 36 such that the tape contacts the side wall surface 38′ in an area 44 and contacts the side wall surface 40′ in an area 46. The contact areas for the tape with respect to the side walls, that is areas 20, 22, 44 and 46, are also shown as A, and these may all be equal or may be slightly different from one another depending upon the relative pressure differentials existing within each area of the vacuum loop boxes. By controlling the partial vacuum which exists below the tapes in each of the vacuum loop boxes and by properly controlling the speed of the reel motors for the supply reel 2 and the takeup reel 8, similar loops will be established in each vacuum loop box and a uniform tension will be exerted upon the tape throughout.

Figure 2:
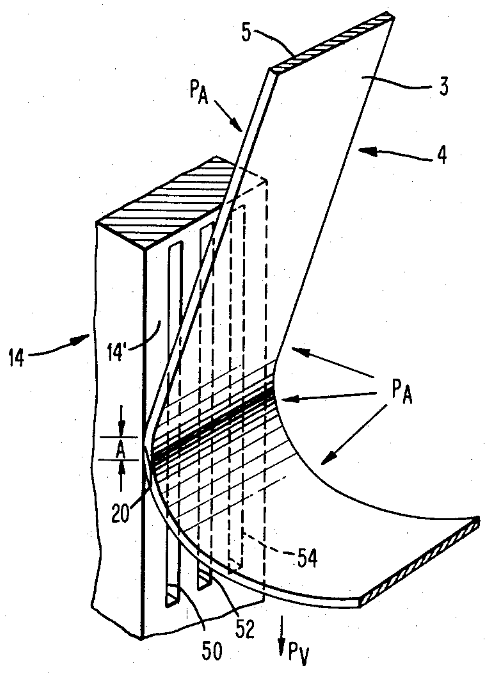
FIGURE 2 is a partial prospective view of one of the side walls of FIGURE 1 illustrating the concept of the invention in greater detail.

FIGURE 2 shows a partial prospective view of the vacuum loop box 12 of FIGURE 1 and illustrates the side wall surface 14′ in greater detail. The front and back panels have been removed for simplicity. Machined or otherwise placed into the surface 14′ are a set of channels 50, 52 and 54 which communicate with the regions of air pressure above and below the surfaces of the tape 4. Existing above surface 3 of the tape and to the left behind the tape 4 in loop box 18, that is within the area between the surface 5 of tape 4 and the surface 14′ of the side wall, exists air at atmospheric pressure. In the area below the tape surface 5 towards the bottom of the vacuum loop box, exists a partial vacuum. Due to the pressure differential between the air at atmospheric pressure behind the tape and the partial vacuum below the tape, the air at atmospheric pressure will move at high velocity into the partial vacuum. By Bernoulli's principle, air moving at high velocities create low pressure areas. Thus the air moving at a high rate of speed through the channels 50, 52 and 54 causes the creation therein of a low pressure area. As a result of this low pressure area behind the tape surface 5 and the air at atmospheric pressure on the surface 3 of the tape 4, the tape is forced against the surface 14′ of the side wall of the vacuum loop box. The area of contact indicated as A in FIGURE 2, will be dependent upon the amount of pressure differential which is created and upon the amount of tape which is present within the vacuum loop box 12.

Individual channels 50, 52 and 54 can take on any convenient shape desired. For example, they may be semicircular, rectangular or square in cross section. Further, the number and placement of these channels will depend upon the amount of holding force which is desired. For example, if it is desired to have a high degree of holding force, the channels 50, 52 and 54 can have widths of 1/16 of an inch and depths of 1/32 of an inch and be spaced on centers equally spaced across the width of the surface 14′. The length of these channels 50, 52 and 54 may be in the range of 7½ inches to allow for a variance in the tape position due to changes in the pressure differentials and in the mode of operation of the tape handling device. If a lower clamping force is desired, the tape clamps may have a rectangular configuration and be 1/32 of an inch in width and 1/64 of an inch deep. It should be understood that the number of channels which are employed as well as the relative dimensions will be dependent solely upon the amount of holding pressure which is desired at any particular surface. It is not intended to limit the scope of this invention to the specific dimensions listed above. These are merely furnished for the purpose of illustration.

The use of such tape clamping devices permits the tape to follow desired and controlled tape paths within the vacuum loop boxes. For example, if such tape clamps were not provided, the loops within the vacuum loop boxes 12 and 36 of FIGURE 1 would take on shapes depending upon the relative pressure differentials and the amount of tape available in each of the boxes. The position would be relatively random and not uniform. By means of such tape clamping devices at the areas indicated at 20, 22, 44 and 46 of the respective vacuum loop boxes, a uniform tape loop configuration can be achieved. Further, by means of the holding action of the tape clamps at these four areas a uniform amount of tension can be placed upon the tape which is relatively unaffected by minor changes in the pressure differentials within the vacuum loop boxes. Further the use of such clamps prevents tape oscillation which might occur. If the tape is pulled from the side walls, the creation of temporary low pressure areas causes the tape to be returned to the side wall, destroying the low pressure area and the holding effects and allowing the tape to again be pulled from the side wall. The clamping devices further permit forming of the tape to the proper desired loops as well as guiding the tape for a proper positioning with respect to the capstan or supply and takeup reels.

While there have been shown and described and pointed ou the fundamental novel features of the invention as applied embodiment, it will be understood that various omissions and substitutions and changes of the form and details of the device illustrated and its operation may be made by those skilled in the art, without departing from the spirit of the invention.

The embodiments of the invention in which an exclusive property or privilege is claimed are defined as follows:

1. In a vacuum-type tape handling apparatus wherein a tape having a top and a bottom surface is moved by a capstan from a supply reel to a takeup reel via a pair of vacuum tape boxes, one of said boxes being mounted intermediate said capstan and said reels respectively, said tape forming a loop within said boxes and making contact at at least one area on each side wall of said boxes and being acted upon by air at relatively high pressure at its top surface and by air at low pressure at its bottom surface, an improvement in such an apparatus for controlling the position of said tape within said tape boxes comprising a plurality of channels in at least one selected side wall of each of said tape boxes, said channels being arranged in a direction along the length of said side wall, said channels permitting the introduction of a small amount of air at relatively high pressure into the portion of said tape box with air at low pressure along said bottom surface of said tape to create a low pressure area along the bottom surface of said tape at the contact area with said side wall and permit said tape to be slideably held at the contact area due to the pressure differential between the low pressure air on the bottom surface of the tape and the high pressure air on the top surface of said tape.

2. In a vacuum-type tape handling apparatus wherein a tape having a top and a bottom surface is moved by a capstan from a supply reel to a takeup reel via a pair of vacuum tape boxes, one of said boxes being mounted intermediate said capstan and said reels respectively, said tape forming a loop within said boxes and making contact at at least one area on each side wall of said boxes and being acted upon by fluid at relatively high pressure at its top surface and by fluid at low pressure at its bottom surface, an improvement in such an apparatus for controlling the position of said tape within said tape boxes comprising a plurality of channels in at least one selected side wall of each of said tape boxes, said channels being arranged in a direction along the length of said side wall, said channels permitting the introduction of a small amount of fluid at relatively high pressure into the portion of said tape box with fluid at low pressure along said bottom surface of said tape to create a low pressure area along the bottom surface of said tape at the contact area with said side wall and permit said tape to be slideably held at the contact area due to the pressure differential between the low pressure fluid on the bottom surface of the tape and the high pressure fluid on the top surface of said tape.

References Cited by the Examiner

UNITED STATES PATENTS

| | | | |
|---|---|---|---|
| 2,970,732 | 2/61 | Lawrance et al. | 226—50 |
| 2,990,990 | 7/61 | Wilkins | 226—118 X |
| 2,994,903 | 8/61 | Lawrance | 226—118 X |

OTHER REFERENCES

V. Nejezchleb: Volume 6, No. 2, IBM Technical Disclosure Bulletin of July 1962, page 11.

ROBERT B. REEVES, *Primary Examiner.*

RAPHAEL M. LUPO, *Examiner.*